US012710777B2

(12) United States Patent
Luo et al.

(10) Patent No.: US 12,710,777 B2
(45) Date of Patent: Aug. 18, 2026

(54) MULTI-PORT DRIVING AND SENSING CIRCUIT

(71) Applicant: ELAN MICROELECTRONICS CORPORATION, Hsinchu (TW)

(72) Inventors: Hua-I Luo, Taichung City (TW); Te-Sheng Chiu, Hsinchu City (TW)

(73) Assignee: ELAN MICROELECTRONICS CORPORATION, Hsinchu (TW)

( * ) Notice: Subject to any disclaimer, the term of this patent is extended or adjusted under 35 U.S.C. 154(b) by 305 days.

(21) Appl. No.: 18/403,648

(22) Filed: Jan. 3, 2024

(65) Prior Publication Data

US 2024/0241532 A1 Jul. 18, 2024

(30) Foreign Application Priority Data

Jan. 12, 2023 (TW) ................................ 112101441

(51) Int. Cl.
*G05F 1/575* (2006.01)
*G05F 1/595* (2006.01)

(52) U.S. Cl.
CPC .............. *G05F 1/575* (2013.01); *G05F 1/595* (2013.01)

(58) Field of Classification Search
CPC ............. H02M 3/33573; H02M 3/335; H02M 3/33576; H02M 3/1582; H02M 3/158; H02M 3/003; H02M 1/0006; H02M 1/00; H02M 1/327; H02M 1/0054; H02M 1/4233; H02M 1/08; H02M 7/219
See application file for complete search history.

(56) References Cited

U.S. PATENT DOCUMENTS 9,882,480 B2 * 1/2018 Lee ........................ H02M 3/07
2018/0278163 A1 9/2018 Lee

* cited by examiner

*Primary Examiner* — Bryan R Perez
(74) *Attorney, Agent, or Firm* — patenttm.us

(57) ABSTRACT

A multi-port driving and sensing circuit is disclosed and provided for multi-load application. The multi-port driving and sensing circuit has a plurality of bridge switching unit and a controlling unit. A first and second upper switches of each bridge switching unit are commonly connected to a driving voltage terminal, and a first and second lower switches are commonly connected to a reference voltage terminal. When the controlling unit executes a sensing procedure, the first and second upper switches of each bridge switching unit disconnect to the driving voltage terminal and a sensing voltage signal of a load connected to each bridge switching unit is read through a signal reading unit. Therefore, when the sensing voltage signal of the load connected to one of the bridge switching units is read, the sensing voltage signal is not interfered by other sensing voltage signals of the load connected to other bridge switching units.

20 Claims, 8 Drawing Sheets

MULTI-PORT DRIVING AND SENSING CIRCUIT

CROSS-REFERENCE TO RELATED APPLICATIONS

This application is based upon and claims priority under 35 U.S.C. 119 from Taiwan Patent Application No. 112101441 filed on Jan. 12, 2023, which is hereby specifically incorporated herein by this reference thereto.

BACKGROUND OF THE INVENTION

1. Field of the Invention

The present invention is related to a driving and sensing circuit and more particularly to a multi-port driving and sensing circuit.

2. Description of the Prior Arts

A plurality of single-port driving and sensing circuits are integrated into a controller and are commonly connected to the same power source circuit. When the controller uses the single-port driving and sensing circuits to respectively drive and sense the sensing voltage signals of a plurality of loads, the sensing voltage signals easily interfere with each other.

To overcome the shortcomings, the present invention provides a multi-port driving and sensing circuit to mitigate or to obviate the aforementioned problems.

SUMMARY OF THE INVENTION

An objective of the present invention is to provide a multi-port driving and sensing circuit to accurately obtain sensing voltage signals of a plurality of loads.

The multi-port driving and sensing circuit has:

- a power unit having a driving voltage terminal and a reference voltage terminal;
- a plurality of bridge switching units, each of the bridge switching units has a first upper switch a second upper switch, a first lower switch and a second lower switch, wherein the first and second lower switches are respectively connected to the first and second upper switches; wherein each of the bridge switching units further has a first sensing terminal and a second sensing terminal; wherein the first and second upper switches are commonly connected to the driving voltage terminal and the first and second lower switches are commonly connected to the reference voltage terminal;
- a signal reading unit connected to the first and second sensing terminals; and
- a controlling unit connected to the bridge switching units and the signal reading unit, wherein the controlling unit has a driving procedure and a sensing procedure, wherein
- when the controlling unit executes the driving procedure, one of the first and second upper switches of the bridge switching unit is switched to turn on for supplying a driving voltage to a load; and
- when the controlling unit executes the sensing procedure, the first and second upper switches of the bridge switching unit are switched to turn off to disconnect to the driving voltage terminal, and then a sensing voltage signal of the load connected to the bridge switching unit is obtained by the signal reading unit.

Based on the foregoing description, the multi-port driving and sensing circuit mainly provides the sensing procedure. In the sensing procedure, the controlling unit turns off the first and second upper switches of each bridge switching unit to disconnect to the driving voltage terminal. Then, the controlling unit accurately obtains the sensing voltage signals of the loads through the signal reading unit, since the sensing voltage signals of the loads do not interfere with each other through the driving voltage terminal.

Other objectives, advantages and novel features of the invention will become more apparent from the following detailed description when taken in conjunction with the accompanying drawings.

DETAILED DESCRIPTION OF THE EMBODIMENTS

Figure 1A:
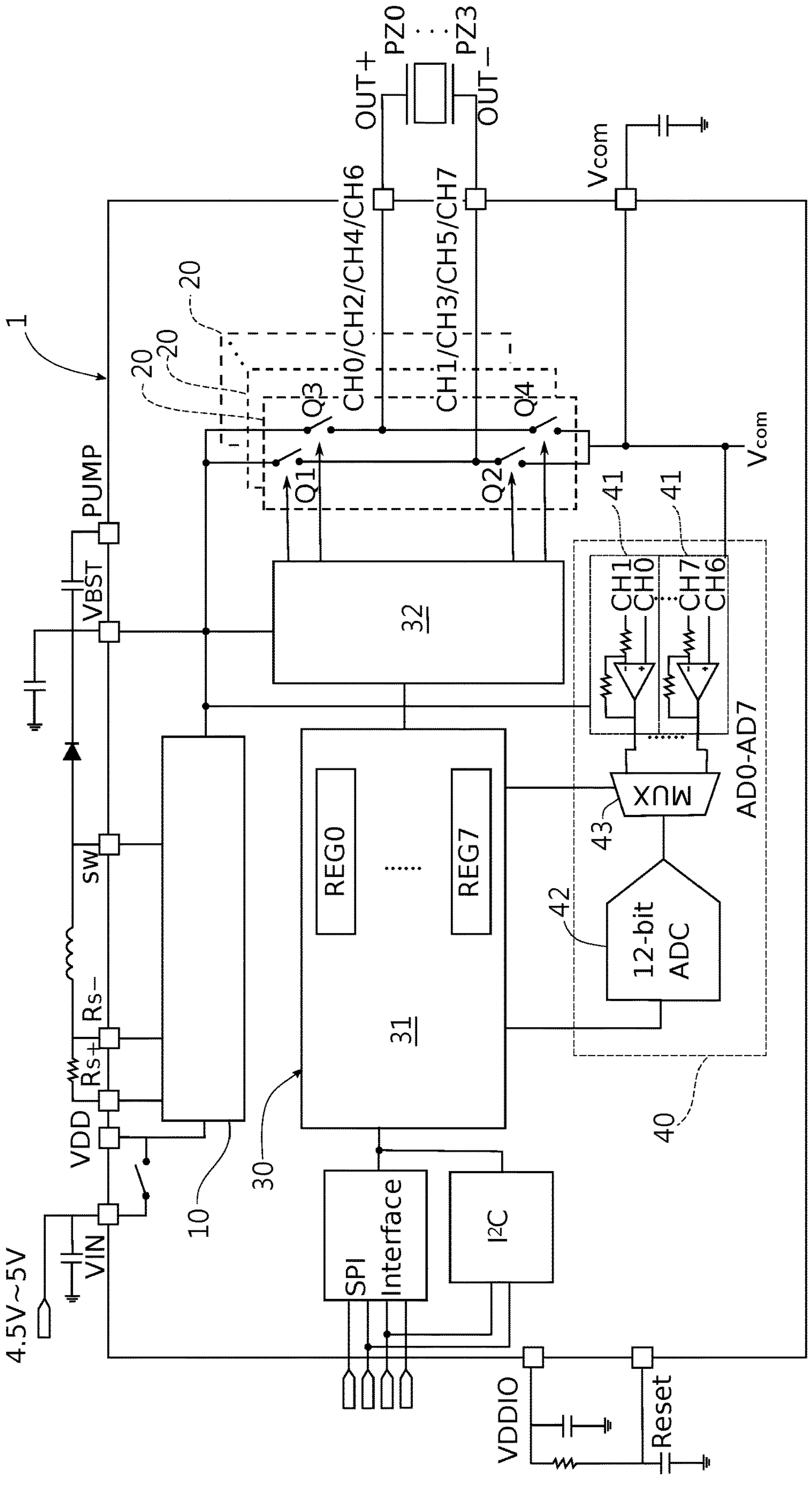
FIG. 1A is a circuit diagram of a multi-port driving and sensing circuit in accordance with the present invention.

With reference to FIG. 1A, a multi-port driving and sensing circuit 1 of the present invention has a power unit 10, a plurality of bridge switching unit 20, and a controlling unit 30. In one embodiment, the multi-port driving and sensing circuit is implemented as an integrated circuit.

The circuit unit 10 has a driving voltage terminal $V_{BST}$ and a reference voltage terminal $V_{COM}$. In one embodiment, the power unit 10 is a voltage booster and a driving voltage of the driving voltage terminal $V_{BST}$ is larger than a reference voltage of the reference voltage terminal $V_{COM}$. For different load applications, the driving voltage terminal may provide the driving voltage of tens of volts. In addition, the reference voltage of the reference voltage terminal $V_{COM}$ is larger than a conducting voltage of a parasitic diode of a MOSFET, may not be less than 1.5V but may be less than 5V. These values are provided as examples but are not limited thereto.

Each bridge switching unit 20 has a first upper switch Q1, a second upper switch Q3, a first lower switch Q2, and a second lower switch Q4. The first and second lower switches Q2, Q4 are respectively connected to the first and second upper switches Q1, Q3 in serial. A serial-connecting node of the first lower switch Q2 and the first upper switch Q1 is used as a first sensing terminal CH1. A serial-connecting node of the second lower switch Q4 and the second upper switch Q3 is used as a second sensing terminal CH0. Using four bridge switching units 20 as an example, the multi-port driving and sensing circuit 1 has four first sensing terminals CH1, CH3, CH5 and CH7 and four second sensing terminals CH0, CH2, CH4 and CH6. The first and second upper switches Q1 and Q3 are commonly connected to the driving voltage terminal $V_{BST}$. The first and second lower switches Q2 and Q4 are commonly connected to the reference voltage terminal $V_{COM}$. In one embodiment, the first and second sensing terminals CH0 to CH7 of the bridge switching unit 20 are a plurality of input and output ports of the integrated circuit for respectively connecting to a plurality of loads, such as multiple piezoelectric sensors PZ0 to PZ3. The first upper switch Q1, the second upper switch Q2, a first lower switch Q3 and the second lower switch Q4 may be MOS-FETs, but not limited to.

The controlling unit 30 is connected to the first and second sensing terminals CH0 to CH7 of the bridge switching unit 20 through a signal reading unit 40. In the present embodiment, the controlling unit 30 has a processor 31 and a switch controller 32. The processor 31 controls the first and second upper switches Q1 and Q3 and the first and second lower switches Q2 and Q4 of the bridge switching units 20 to turn on or turn off through the switch controller 32. The processor 31 is connected electrically to the signal reading unit 40. The processor 31 has a plurality of registers REG0 to REG7. The registers REG0 to REG7 respectively correspond to the first and second sensing terminals CH0 to CH7 of the bridge switching units 20. In one application with the four piezoelectric sensors PZ0 to PZ3, the processor 31 has four registers REG0 to REG3, but in another application with eight piezoelectric sensors PZ0 to PZ7, the processor 31 has eight registers REG0 to REG7.

Figure 1B:
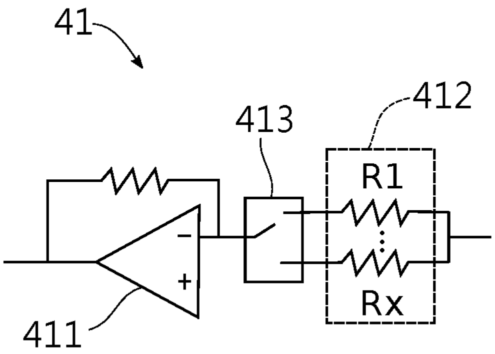
FIG. 1B is a circuit diagram of an amplifying circuit in accordance with the present invention.

The signal reading unit 40 has a plurality of amplifying circuits 41 and an analog to digital converter 42. The amplifying circuits 41 are respectively connected to the first and second sensing terminals CH0 to CH7 of the bridge switching units 20. The analog to digital converter 42 is connected to the amplifying circuits 41 through a multiplexer 43 to selectively convert a plurality of sensing voltage signals outputted from the amplifying circuits 41 to sensing data and then output to the processor 31. The processor 31 stores the sensing data from anyone of the first or second sensing terminals CH0 to CH7 to the corresponding one of the registers REG0 to REG7. Each amplifying circuit 41 has an amplifier 411 and a multi-gain adjustment circuit 412. A plurality of outputs of the amplifiers 411 are connected to the multiplexer 43. The multi-gain adjustment circuit 412 is connected to an input terminal of the amplifier 411 and the processor 31. The processor 31 sets one of multiple gain values of the multi-gain adjustment circuit 412. With reference to FIG. 1B, the multi-gain adjustment circuit 412 has a plurality of resistors R1 to Rx with different resistances, and the resistors R1 to Rx are connected to each other in parallel. One end of each of the resistors R1 to Rx is connected to the input terminal of the amplifier 411 through a switching circuit 413. The switching circuit 413 is connected to the processor 31. The processor 31 selects one of the resistors R1 to RX to connect to the input terminal of the amplifier 411. Therefore, by selecting different resistors R1 to Rx, the gain value of the amplifier 411 may be adjusted. A suitable gain value of the amplifier 411 may be previously adjusted according to a voltage range of the sensing voltage signal of the load.

The processor 31 of the controlling unit 30 has a driving procedure and a sensing procedure. When the processor 31 executes the driving procedure, the processor 31 controls one of the first and second upper switches Q1 and Q3 of each bridge switching unit 20 to turn on through the switch controller 32, and a driving voltage from the driving voltage terminal $V_{BST}$ is then provided to the corresponding first sensing terminals CH1, CH3, CH5 and CH7 or the corresponding second sensing terminals CH0, CH2, CH4 and CH6. Using the piezoelectric sensor as the load, the piezoelectric sensor is driven to vibrate when the driving voltage is provided to anyone of two electrodes of the piezoelectric sensor.

When the processor 31 executes the sensing procedure, the processor 31 controls the first and second upper switches Q1 and Q3 of each bridge switching unit 20 to turn off through the switch controller 32 and to disconnect to the driving voltage terminal $V_{BST}$. After then, the processor 31 obtains the sensing voltage signal of the load connected to each bridge switching unit 20 through the signal reading unit 40. In detail, the processor 31 switches the multiplexer 43 of the signal reading unit 40 to connect the amplifying circuits 41 to the analog to digital converter 42 in sequence so that the sensing voltage signals amplified by the amplifying circuits 41 are converted to the corresponding sensing values in sequence. The processor 31 sequentially stores the sensing values in the corresponding registers REG0 to REG3. That is, the first and second upper switches Q1 and Q3 is turned off when the processor 31 obtains the sensing voltage signal of the load connected to each bridge switching unit 20 through the signal reading unit 40. Therefore, the sensing voltage signals of the loads connected to the bridge switching units 20 do not interfere with each other.

A driving and sensing method of the multi-port driving and sensing circuit connected to the piezoelectric sensors is further described as follows.

Figure 2A:
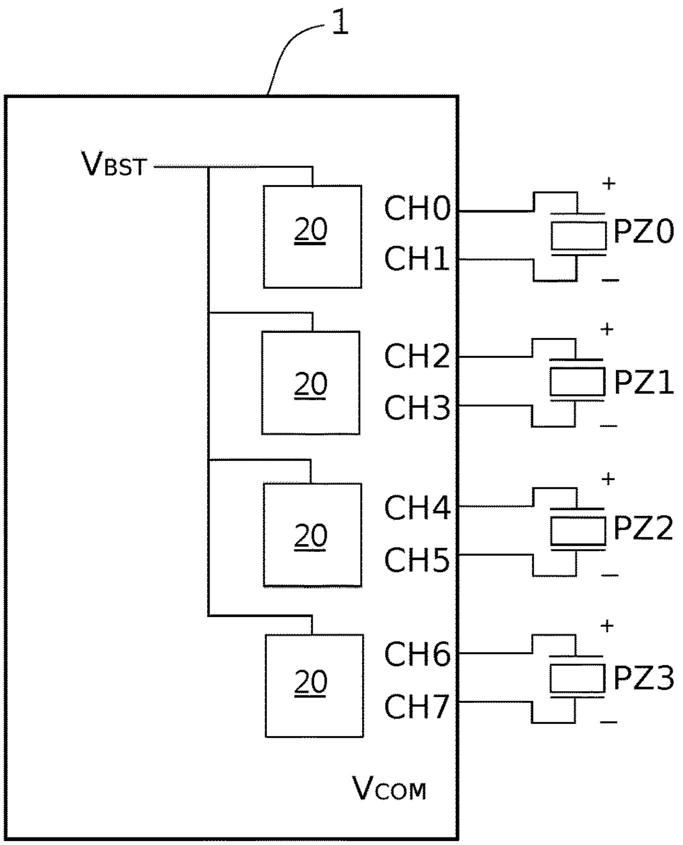
FIG. 2A is a schematic circuit diagram of the circuit diagram of a multi-port driving and sensing circuit with loads in accordance with the present invention.

With reference to FIG. 2A, the multi-port driving and sensing circuit 1 is connected to four piezoelectric sensors PZ0 to PZ3. The four piezoelectric sensors PZ0 to PZ3 are respectively connected to the four bridge switching units 20. A positive electrode (+) of each of the piezoelectric sensors PZ0 to PZ3 is connected to the second sensing terminal CH0, CH2, CH4 or CH6 of the corresponding bridge switching unit 20 and a negative electrode (−) of each of the piezoelectric sensors PZ0 to PZ3 is connected to the first sensing terminal CH1, CH3, CH5 or CH7 of the bridge switching unit 20. In one embodiment, the four piezoelectric sensors PZ0 to PZ3 are positioned under a touchpad. When the touchpad is pressed down, the four piezoelectric sensors PZ0 to PZ3 output the sensing voltage signals corresponding to the pressing position and force. In addition, the multi-port driving and sensing circuit 1 of the present invention may drive anyone of the four piezoelectric sensors PZ0 to PZ3 to vibrate.

Figure 2B:
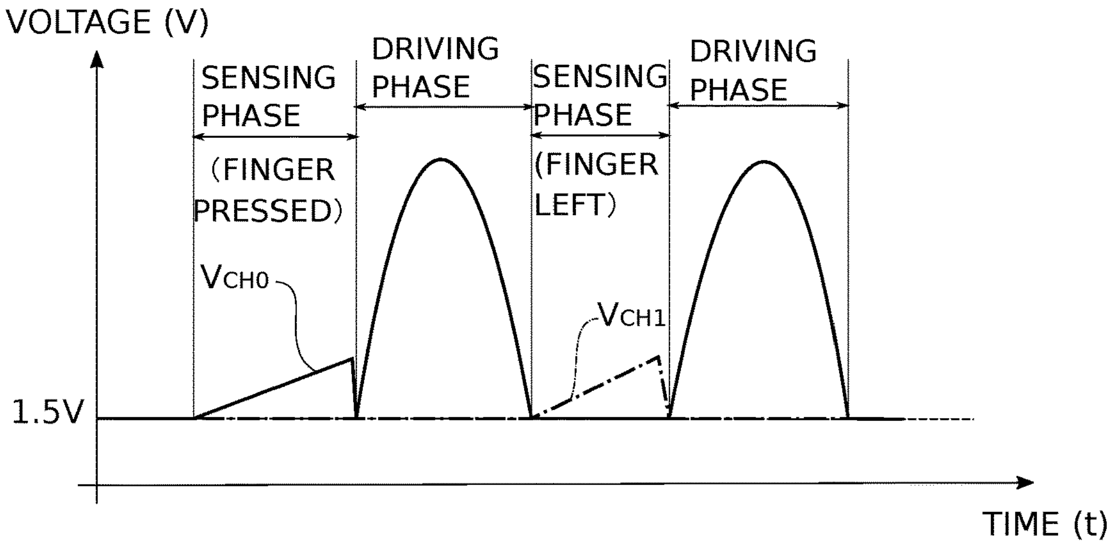
FIG. 2B is a voltage waveform diagram between a first and second sensing terminals of one of a plurality of bridge switching units in accordance with the present invention.
Figure 3A:
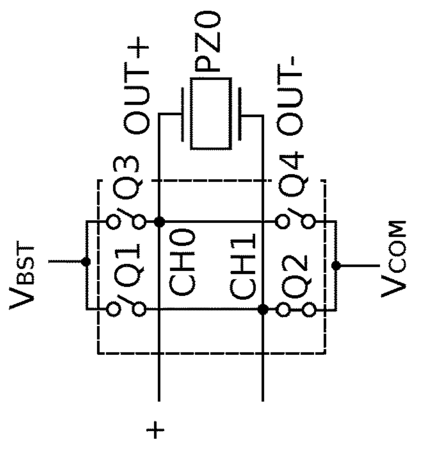
FIGS. 3A to 3D are circuit diagrams in operation of one bridge switching unit corresponding to FIG. 2A.

With reference to FIGS. 1, 2A and 2B, FIG. 2B shows two voltage waveforms of the sensing voltage signals from the first sensing terminal CH1 and the second sensing terminal CH0 of the bridge switching unit 20. When the piezoelectric sensor PZ0 connected to the bridge switching unit 20 is pressed, the voltage level of the second sensing terminal CH0 connected to the positive electrode of the piezoelectric sensor PZ0 rises. With further reference to FIG. 3A, when the processor 31 executes the sensing procedure, the processor 31 turns off the first and second upper switch Q1 and Q3 of the bridge switching unit 20 through the switch controller 32 to disconnect to the driving voltage terminal $V_{BST}$. As shown in FIG. 1, the positive electrode (+) of the piezoelectric sensor PZ0 is only connected to the corresponding amplifying circuit 41. At the time, the processor 31 also turns off the second lower switch Q4 but turns on the first lower switch Q2, so the negative electrode (−) of the piezoelectric sensor PZ0 is connected to the reference voltage terminal $V_{COM}$. The processor 31 switches the multiplexer 43 of the signal reading unit 40 to connect the amplifying circuit 41 connected to the second sensing terminal CH0 of the bridge switching unit 20 to the analog to digital converter 42. After the sensing voltage signal from the second sensing terminal CH0 is amplified, the amplified sensing voltage signal is converted to the sensing value and then stored in the corresponding register REG0 of the processor 31. After the processor 31 sequentially obtains the sensing values, the sensing values are compared with a voltage threshold to determine a touch procedure is established or not. That is, the touch procedure is established if the sensing values exceed the voltage threshold. When the touch procedure is established, the processor 31 ends the sensing procedure and executes the driving procedure. In one embodiment, the processor 31 may output the sensing values to an external device, such as a processor of the touch IC or main processor after the processor 31 obtains the sensing values. The external device determines the touch procedure is established or not according to the sensing values. When the external device determines the touch procedure is established, the processor 31 will be notified by the external device. After then, the processor 31 ends the sensing procedure and executes the driving procedure.

Figure 3B:
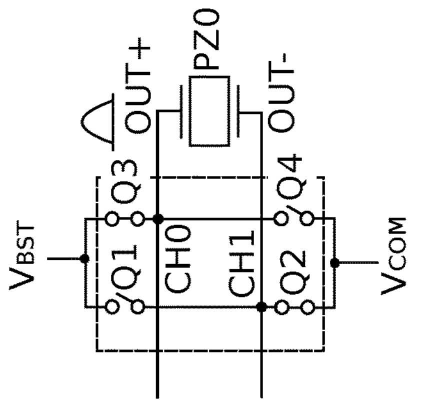

With reference to FIG. 3B, when the processor 31 executes the driving procedure, the first upper switch Q1 and the second lower switch Q4 still turn off, the first lower switch Q2 still turns on but the second upper switch Q3 is switched to turn on. Thus, the second sensing terminal CH0 is connected to the driving voltage terminal $V_{BST}$ to drive the piezoelectric sensor PZ0 to vibrate. As shown in FIG. 2B, the voltage waveform of the second sensing terminal CH0 becomes to a sine wave. At the time, a user's finger on the touchpad feels the vibration, after the user's finger presses the touchpad down.

Figure 3C:
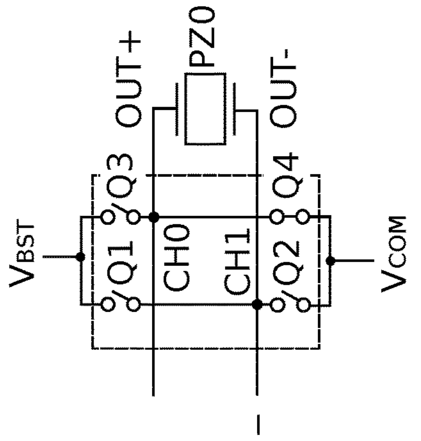

At the moment when the user's finger left the touchpad, the voltage levels of the positive and negative electrodes of the piezoelectric sensor PZ0 are changed. As shown in FIG. 5B, a voltage waveform in a sensing phase when the user's finger left the touchpad is shown. Based on the reference voltage of the reference voltage terminal $V_{COM}$ as a base voltage level, the voltage level of the sensing voltage signal in the sensing phase is negative. The negative sensing voltage of the sensing voltage signal can't be obtained if the voltage level of the sensing voltage signal falls to smaller than the reference voltage $V_{COM}$. To avoid this situation, as shown in FIG. 3C, when the processor 31 executes the sensing procedure, the first and second upper switches Q1 and Q3 still turn off, but the second lower switch Q4 is switched to turn on to connect the positive electrode (+) of the piezoelectric sensor PZ0 to the reference voltage terminal $V_{COM}$. With further reference to FIG. 1, the amplifying circuit 41 can read voltage change of the negative electrode (−) of the piezoelectric sensor PZ0 connected to the first sensing terminal CH1 so a positive sensing voltage of the sensing voltage signal of the piezoelectric sensor PZ0 is obtained. At the time, as shown in FIG. 1, the processor 31 also switches the multiplexer 43 of the signal reading unit 40 to connect the amplifying circuit 41 connected to the first sensing terminal CH1 of the bridge switching unit 20 to the analog to digital converter 42. After the sensing voltage signal from the first sensing terminal CH1 is amplified, the amplified sensing voltage signal is converted to the sensing value and then stored in the corresponding register REG1 of the processor 31. After the processor 31 sequentially obtains the sensing values, the processor 31 may directly determine or be notified if a touch procedure is established or not. When the touch procedure is established, the processor 31 ends the sensing procedure and executes the driving procedure.

Figure 3D:
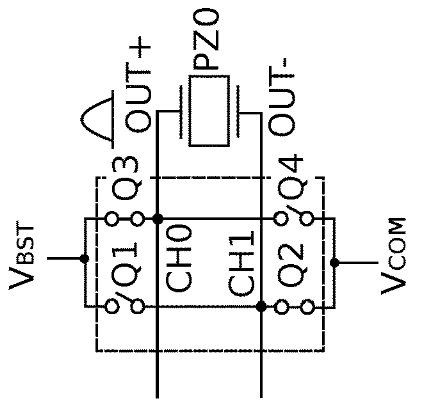

When the processor 31 executes the driving procedure, as shown in FIG. 3D, the first upper switch Q1 still turns off, but the second upper switch Q3 and the first lower switch Q2 are switched to turn on and the second lower switch Q4 is switched to turn off. The statuses of these switches in FIG. 3D are the same as shown in FIG. 3A. Since the second upper switch Q3 turns on, the second sensing terminal CH0 of the piezoelectric sensor PZ0 is connected to the driving voltage terminal $V_{BST}$ to drive the piezoelectric sensor PZ0 to vibrate. As shown in FIG. 2B, the voltage waveform of the second sensing terminal CH0 becomes to a sine wave. At the time, a user's finger on the touchpad feels the vibration, after the user's finger leaves the touchpad.

Based on the foregoing description of the driving and sensing method, in the sensing procedure, the processor 31 of the controlling unit 30 turns off the first and second upper switches Q1 and Q3 of the present bridge switching unit 20 through the switch controller 32 to prevent that the sensing voltage signal from the load connected to the bridge switching unit 20 is interfered by other sensing voltage signals of the loads connected to the other bridge switching units 20 when it is reading.

Figure 2C:
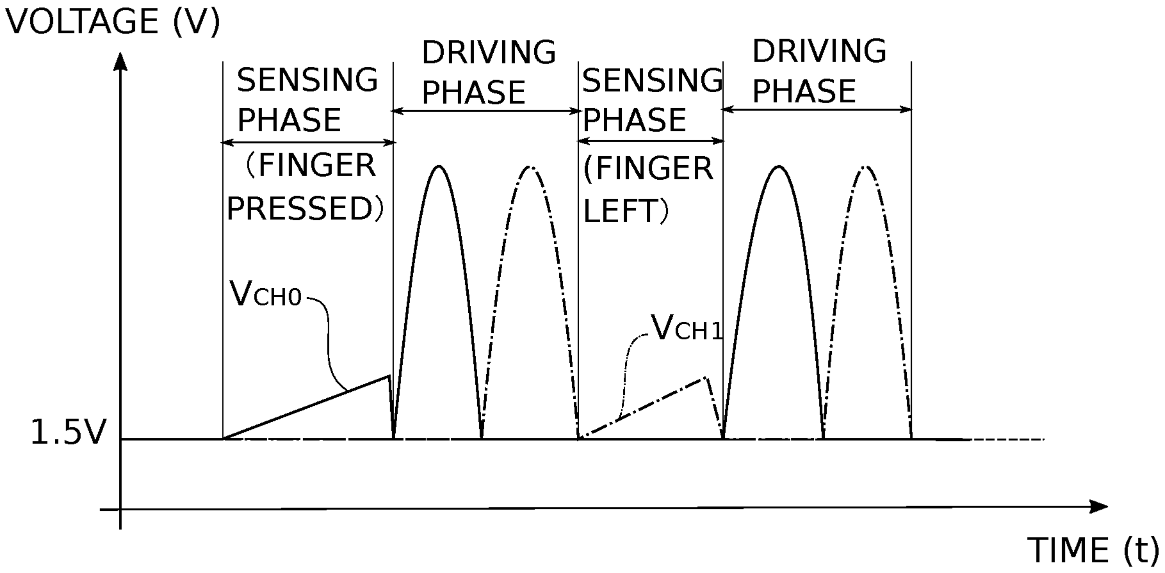
FIG. 2C is another voltage waveform diagram between a first and second sensing terminals of one of a plurality of bridge switching units in accordance with the present invention.

Another driving and sensing method is further described as follows. With reference to FIG. 2C, two voltage waveforms of the first and second sensing terminals CH1 and CH0 of the bridge switching unit 20 shown in FIG. 2A are shown. With further reference to FIGS. 4A to 4F, the driving procedure and the sensing procedure for the piezoelectric sensor PZ0 are further described.

Figure 4A:
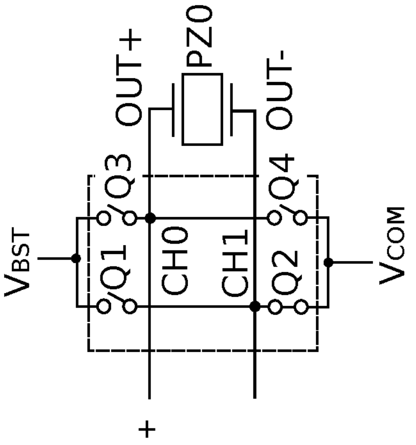
FIGS. 4A to 4F are circuit diagrams in operation of one bridge switching unit corresponding to FIG. 2B.

With reference to FIGS. 1 and 4A, the processor 31 of the controlling unit 30 executes the sensing procedure to obtain the sensing voltage signal of the piezoelectric sensor PZ0 connected to the bridge switching unit 20. As the description in FIG. 3A, the processor 31 turns off the first and second upper switches Q1 and Q3 and the second lower switch Q4 and turns on the first lower switch Q2 of the bridge switching unit 20 through the switch controller 32. The amplifying circuit 41 connected to the second sensing terminal CH0 reads the sensing voltage signal of the positive electrode (+) of the piezoelectric sensor PZ0. At the time, the processor 31 also switches the multiplexer 43 to connect the amplifying circuit 41 to the analog to digital circuit 42. The amplified sensing voltage signal is converted to sensing value and then output to the processor 31. The processor 31 stores the sensing value in the corresponding register REG0.

Figure 4B:
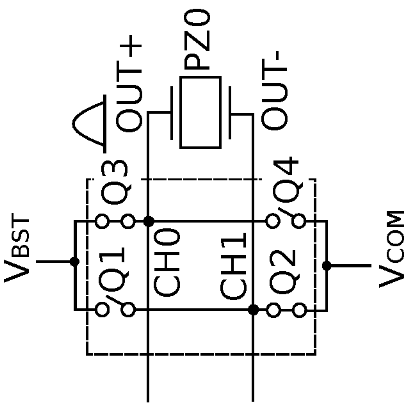
Figure 4C:
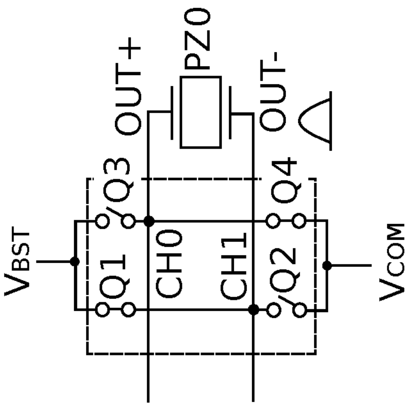

With reference to FIG. 4B, the processor 31 of the controlling unit 30 executes the driving procedure, which is the same as the executed driving procedure in FIG. 3B. The first upper switch Q1 and the second lower switch Q4 still turn off, the first lower switch Q2 still turns on, but the second upper switch Q3 is switched to turn on. Thus, the second sensing terminal CH0 is connected to the driving voltage terminal $V_{BST}$ to drive the piezoelectric sensor PZ0 to vibrate. With further reference to FIG. 4C, the second upper switch Q3 and the first lower switch Q2 are switched to turn off, and the first upper switch Q1 and the second lower switch Q4 are switched to turn on. The first sensing terminal CH1 is connected to the driving voltage $V_{BST}$ to drive the piezoelectric sensor PZ0 to vibrate, too. At this time, the vibration generated after the finger presses the touchpad is sensed, so that the user feels haptic feedback.

Figure 4D:
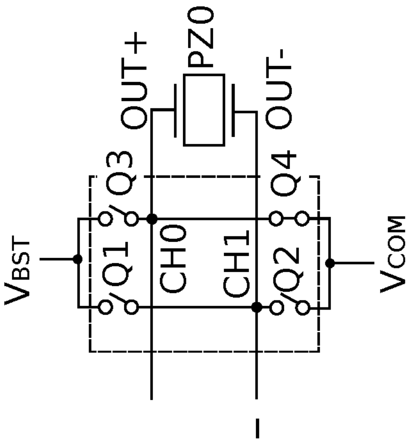

With further reference to the FIG. 4D, to detect the moment when the user removes his finger from the touchpad, the processor 31 of the controlling unit 30 executes the sensing procedure which is the same as the executed sensing procedure of FIG. 3C. That is, the first and second upper switches Q1 and Q3 are switched to turn off, the first lower switch Q2 still turns off and the second lower switch Q4 turns on. The positive electrode (+) of the piezoelectric sensor PZ0 is connected to the reference voltage terminal $V_{COM}$, and the amplifying circuit 41 reads the voltage changes of the negative electrode (−) of the piezoelectric sensor PZ0 connected to the second sensing terminal CH0. Therefore, the amplifying circuit 41 can read positive sensing voltage from the piezoelectric sensor PZ0.

Figure 4E:
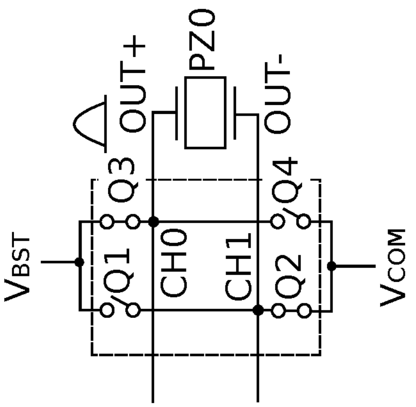
Figure 4F:
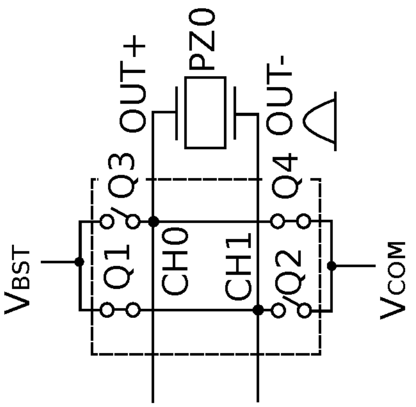

Once the moment when the user removes his finger from the touchpad is sensed in the executed sensing procedure of FIG. 4D, the processor 31 of the controlling unit 30 sequentially executes the driving procedure shown in FIGS. 4E and 4F which are the same as the executed driving procedure in FIGS. 4B and 4C. As shown in FIG. 4E, when the processor 31 of the controlling unit 30 executes the driving procedure, the first upper switch Q1 still turns off, the second lower switch Q4 is switched to turn off and the first lower switch Q2 and the second upper switch Q3 are switched to turn on. Therefore, the second sensing terminal CH0 is connected to the driving voltage terminal $V_{BST}$ to drive the piezoelectric sensor PZ0 to vibrate. After that, as shown in FIG. 4F, the second upper switch Q3 and the first lower switch Q2 are switched to turn off and the first upper switch Q1 and the second lower switch Q4 are switched to turn on. Therefore, the first sensing terminal CH1 is connected to the driving voltage $V_{BST}$ to drive the piezoelectric sensor PZ0 to vibrate, too.

Based on the foregoing description of the second driving and sensing method, in the same sensing procedure, the processor 31 of the controlling unit 30 switches the first and second upper switches Q1, Q3 of the bridge switching unit 20 which is read by the signal reading unit 40 to turn off. Therefore, the sensing voltage signal from the load connected to the bridge switching unit 20 may not be interfered by other sensing voltage signals of the loads connected to the other bridge switching units 20 when it is reading.

Figure 5A:
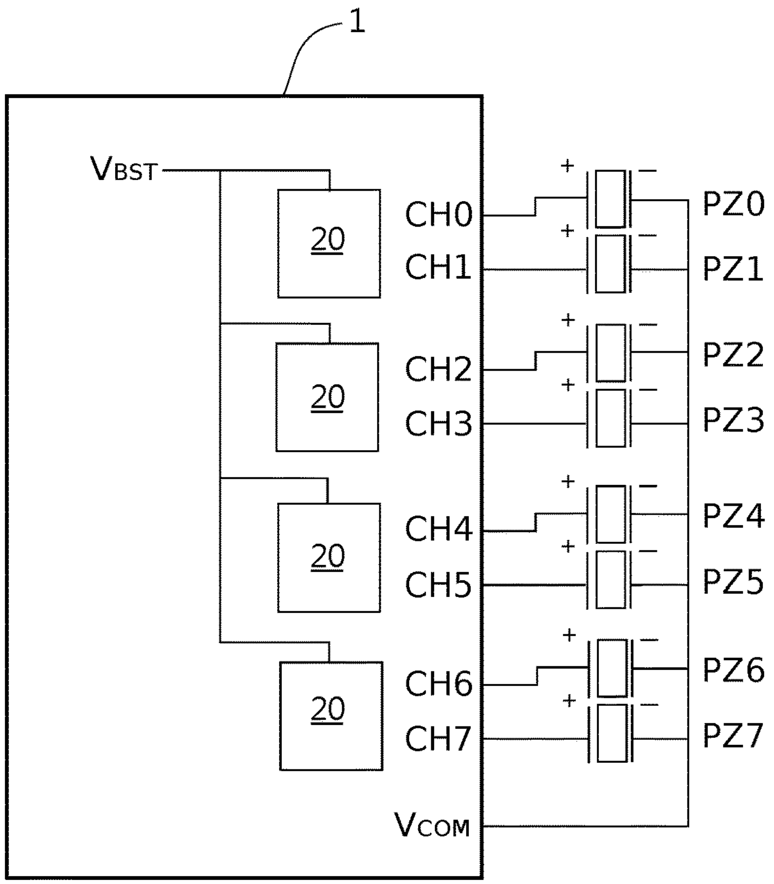
FIG. 5A is another schematic circuit diagram of the circuit diagram of a multi-port driving and sensing circuit with loads in accordance with the present invention.
Figure 5B:
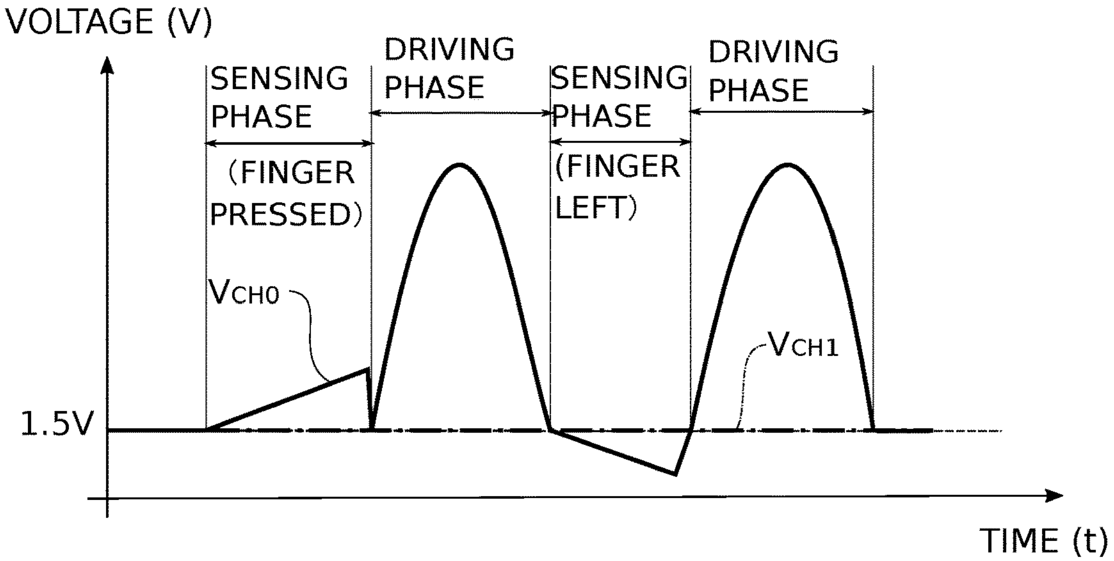
FIG. 5B is a voltage waveform diagram between a first and second sensing terminals of the bridge switching units in FIG. 5A.

With reference to FIG. 5A, a multi-port driving and sensing circuit 1 of the present invention is connected to eight piezoelectric sensors PZ0 to PZ7. The positive electrodes (+) of the eight piezoelectric sensors PZ0 to PZ7 are respectively connected to the first and second sensing terminals CH0 to CH 7 of the four bridge switching units 20. The negative electrodes (−) are directly connected to the reference voltage terminal $V_{COM}$, so the first and second lower switches Q2 and Q4 of the bridge switching units 20 are turn off in both the sensing procedure and driving procedure. With further reference to FIG. 5B, two voltage waveforms of the first and second sensing terminals CH1 and CH0 of one of the bridge switching units 20 are shown in FIG. 5A.

Figure 6A:
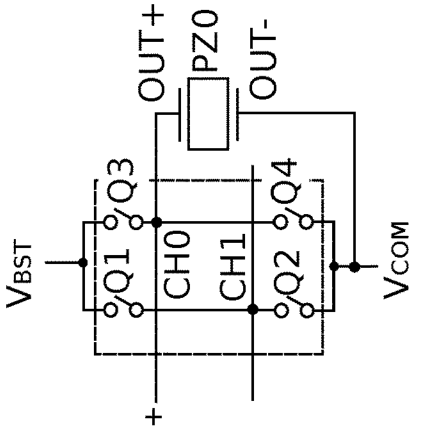
FIGS. 6A to 6D are circuit diagrams in operation of one bridge switching unit corresponding to FIG. 5A.

Using one of the bridge switching units 20 connected to the piezoelectric sensor PZ0 as an example to describe the driving and sensing method of FIG. 5A. When the piezoelectric sensor PZ0 is pressed, as shown in FIG. 5B, a voltage level of the second sensing terminal CH0 is rising. At the time, as shown in FIG. 6A, the processor 31 of the controlling unit 30 switches the first and second upper switches Q1 and Q3 of the bridge switching unit 20 to turn off to disconnect to the driving voltage terminal $V_{BST}$. Therefore, the positive electrode (+) of the piezoelectric sensor PZ0 is only connected to the corresponding amplifying circuit 41. At the time, as shown in FIG. 1, the processor 31 switches the multiplexer 43 of the signal reading unit 40 to connect the amplifying circuit 41 connected to the second sensing terminal CH0 of the bridge switching unit 20 to the analog to digital converter 42. After the sensing voltage signal from the second sensing terminal CH0 is amplified, the amplified sensing voltage signal is converted to the sensing value and then stored in the corresponding register REG0 of the processor 31. After the processor 31 sequentially obtains the sensing values, the processor 31 may directly determine or be notified if a touch procedure is established or not. When the touch procedure is established, the processor 31 ends the sensing procedure and executes the driving procedure.

Figure 6B:
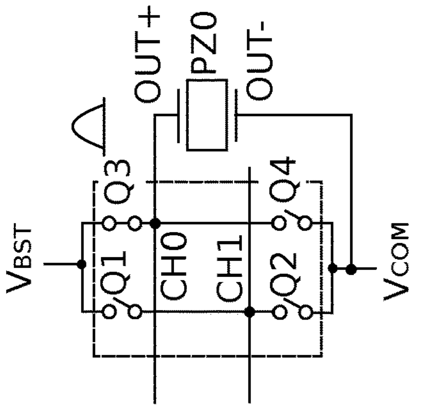

When the processor 31 executes the driving procedure, as shown in FIG. 6B, the first upper switch Q1 is still turned off, but the second upper switch Q3 is switched to turn on. Therefore, the second sensing terminal CH0 is connected to the driving voltage terminal $V_{BST}$ to drive the piezoelectric sensor PZ0 to vibrate. At the time, as shown in FIG. 5B, the voltage waveform of the second sensing terminal CH0 becomes the sine waveform, and the user can feel the vibration after the user presses the touchpad.

Figure 6C:
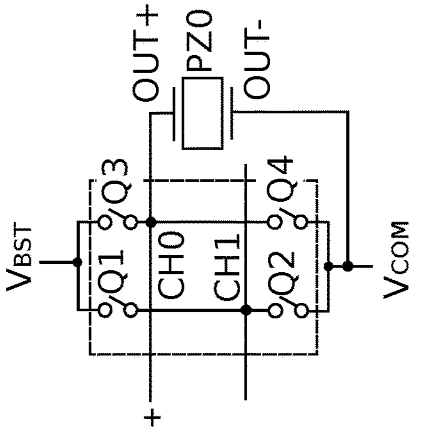

The voltage levels of the positive and negative electrodes (+) and (−) of the piezoelectric sensor PZ0 are changed at the moment when the user's finger is left the touchpad. Using the reference voltage of the reference voltage terminal $V_{COM}$ as a base voltage level, the voltage level of the sensing voltage signal is negative. At the time, the processor 31 executes the sensing procedure, as shown in FIG. 6C, the processor 31 switches the first and second upper switches Q1 and Q3 of the bridge switching unit 20 to turn off. Since the amplifying circuit 41 reads the voltage changes of the positive electrode (+) of the piezoelectric sensor PZ0 connected to the second sensing terminal CH0, the negative sensing voltage of the piezoelectric sensor PZ0 is read. As shown in FIG. 1, the processor 31 also switches the multiplexer 43 of the signal reading unit 40 to connect the amplifying circuit 41 connected to the first sensing terminal CH1 of the bridge switching unit 20 to the analog to digital converter 42. After the sensing voltage signal of the second sensing terminal CH0 is amplified by the amplifying circuit 41 connected to the first sensing terminal CH1, the amplified sensing voltage signal is further converted to the sensing value by the analog to digital converter 42 and then stored in the corresponding register REG0 of the processor 31. After the processor 31 sequentially obtains the sensing values, the processor 31 may directly determine or be notified if a touch procedure is established or not. When the touch procedure is established, the processor 31 ends the sensing procedure and executes the driving procedure.

Figure 6D:
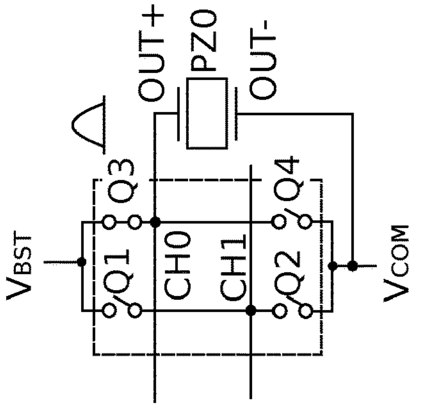

When the processor 31 executes the driving procedure, as shown in FIG. 6D which is the same as FIG. 6B, the first upper switch Q1 is still turned off and the second upper switch Q3 is switched to turn on. The second sensing terminal CH0 is connected to the driving voltage $V_{BST}$ to drive the piezoelectric sensor PZ0 to vibrate. As shown in FIG. 5B, the voltage waveform of the second sensing terminal CH0 becomes the sine waveform. At the time, the user can feel the vibration after the user presses the touchpad.

Based on the third driving and sensing method as mentioned above, in the same sensing procedure, the processor 31 of the controlling unit 30 switches the first and second upper switches Q1, Q3 of the bridge switching unit 20 which is read by the signal reading unit 40 to turn off. Therefore, the sensing voltage signal from the load connected to the bridge switching unit 20 may not be interfered by other sensing voltage signals of the loads connected to the other bridge switching units 20 when it is reading.

Based on the foregoing description, the multi-port driving and sensing circuit of the present invention is provided for multi-load application. When the controlling unit executes the sensing procedure, the first and second upper switches of each bridge switching unit are switched to turn off to disconnect the diving voltage terminal. Therefore, the interference among sensing voltage signals caused by the common connection with the power unit is prevented and the controlling unit can obtain an accurate sensing voltage signal of the load connected to each bridge switching unit through the signal reading unit. In addition, since the processor has some built-in registers for each of the first and second sensing terminals, the sensing value converted from the sensing voltage signal from each sensing terminal is stored in the corresponding register and a frequency of reading sensing values of multiple ports is relatively decreased.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A multi-port driving and sensing circuit comprising:

a power unit having a driving voltage terminal and a reference voltage terminal;

a plurality of bridge switching units, each of the bridge switching units has a first upper switch, a second upper switch, a first lower switch and a second lower switch, wherein the first and second lower switches are respectively connected to the first and second upper switches; wherein each of the bridge switching units further has a first sensing terminal and a second sensing terminal; wherein the first and second upper switches are connected to the driving voltage terminal and the first and second lower switches are connected to the reference voltage terminal, wherein the first sensing terminals and the second sensing terminals of the plurality of the bridge switching units are configured to respectively connect to a plurality of loads;

a signal reading unit connected to the first and second sensing terminals; and a controlling unit connected to the bridge switching units and the signal reading unit, wherein the controlling unit has a driving procedure and a sensing procedure; wherein when the controlling unit executes the driving procedure, the controlling unit switches one of the first and second upper switches of any one of the bridge switching units to turn on for supplying a driving voltage to the load through the driven bridge switch unit; and when the controlling unit executes the sensing procedure, the controlling unit switches the first and second upper switches of any one of the bridge switching units to turn off to disconnect to the driving voltage terminal, and reads a sensing voltage signal of the load through the driven bridge switching unit and the signal reading unit.

2. The multi-port driving and sensing circuit as claimed in claim 1, wherein the first and second sensing terminals of each bridge switching unit are respectively connected to a positive electrode and a negative electrode of the corresponding load, wherein the positive electrode is connected to the second upper switch and the negative electrode is connected to the first lower switch; and when the controlling unit executes the sensing procedure, the controlling unit switches the first lower switch of the bridge switching unit to turn on to connect the negative electrode with the reference voltage terminal and reads the sensing voltage signal of the positive electrode of the corresponding load connected to the bridge switching unit through the signal reading unit.

3. The multi-port driving and sensing circuit as claimed in claim 2, wherein when the controlling unit determines that a sensing voltage of the sensing voltage signal of the positive electrode exceeds a voltage threshold, the driving procedure is executed, and then the controlling unit switches the second upper switch and the first lower switch of the bridge switching unit to turn on to provide the driving voltage to the positive electrode of the corresponding load.

4. The multi-port driving and sensing circuit as claimed in claim 3, wherein in the driving procedure, after the controlling unit switches the second upper switch and the first lower switch of the bridge switching unit to turn on, the controlling unit switches the second upper switch and the first lower switch to turn off and simultaneously switches the first upper switch and the second lower switch to turn on to supply the driving voltage to the negative electrode of the load.

5. The multi-port driving and sensing circuit as claimed in claim 2, wherein the controlling unit has a processor switching the first and second upper switches and the first and second lower switches of each bridge switching unit to turn on or off through a switch controller, wherein the processor is electrically connected to the signal reading unit and has a plurality of registers respectively connected to the first and second sensing terminals of the bridge switching units.

6. The multi-port driving and sensing circuit as claimed in claim 5, wherein the signal reading unit has:

a plurality of amplifying circuits respectively connected to the first and second sensing terminals of the bridge switching units; and an analog to digital converter connected to the amplifying circuits through a multiplexer, converting the sensing voltage signals from the amplifying circuits to multiple sensing values, then outputting the sensing values to the processor, wherein the processor stores the sensing value from one of the first and second sensing terminals in one of the registers.

7. The multi-port driving and sensing circuit as claimed in claim 6, wherein the signal reading unit has:

an amplifier having an output terminal connected to the multiplexer; and a multi-gain adjustment circuit connected to an input terminal of the amplifier and the processor, wherein the processor sets one of a plurality of gain values of the multi-gain adjustment circuit.

8. The multi-port driving and sensing circuit as claimed in claim 7, wherein the multi-gain adjustment circuit has a plurality of resistors with different resistances connected to each other in parallel, wherein one end of each of the resistors is connected to the input terminal of the amplifier through a switching circuit, wherein the switching circuit is connected to the processor and the processor selects one of the resistors to connect to the input terminal of the amplifier.

9. The multi-port driving and sensing circuit as claimed in claim 2, wherein the power unit is a voltage booster;

each of the first and second upper switches and each of the first and second lower switches are MOSFET; and the load is a piezoelectric sensor.

10. The multi-port driving and sensing circuit as claimed in claim 9, wherein a reference voltage of the reference voltage terminal is larger than a conducting voltage of a parasitic diode of the MOSFET.

11. The multi-port driving and sensing circuit as claimed in claim 10, wherein the reference voltage is not less than 1.5V and less than 5V.

12. The multi-port driving and sensing circuit as claimed in claim 1, wherein the first and second sensing terminals of each bridge switching unit are respectively connected to a positive electrode and a negative electrode of the corresponding load, wherein the positive electrode is connected to the second upper switch and the negative electrode is connected to the first lower switch; and when the controlling unit executes the sensing procedure, the controlling unit switches the second lower switch of the bridge switching unit to turn on to connect the positive electrode with the reference voltage terminal and reads the sensing voltage signal of the negative electrode of the corresponding load connected to the bridge switching unit through the signal reading unit.

13. The multi-port driving and sensing circuit as claimed in claim 12, wherein when the controlling unit determines that a sensing voltage of the sensing voltage signal of the negative electrode exceeds a voltage threshold, the driving procedure is executed, and then the controlling unit switches the second upper switch and the first lower switch of the bridge switching unit to turn on to provide the driving voltage to the positive electrode of the corresponding load.

14. The multi-port driving and sensing circuit as claimed in claim 13, wherein in the driving procedure, after the controlling unit switches the second upper switch and the first lower switch of the bridge switching unit to turn on, the controlling unit switches the second upper switch and the first lower switch to turn off and simultaneously switches the first upper switch and the second lower switch to turn on to supply the driving voltage to the negative electrode of the load.

15. The multi-port driving and sensing circuit as claimed in claim 12, wherein the controlling unit has a processor switching the first and second upper switches and the first and second lower switches of each bridge switching unit to turn on or off through a switch controller, wherein the processor is electrically connected to the signal reading unit and has a plurality of registers respectively connected to the first and second sensing terminals of the bridge switching units.

16. The multi-port driving and sensing circuit as claimed in claim 12, wherein the power unit is a voltage booster;

each of the first and second upper switches and each of the first and second lower switches are MOSFET; and the load is a piezoelectric sensor.

17. The multi-port driving and sensing circuit as claimed in claim 1, wherein the first sensing terminal of each bridge switching unit is connected to a positive electrode of the corresponding load, wherein the positive electrode is connected to the second upper switch, and a negative electrode of the corresponding load is connected to the reference voltage terminal; and when the controlling unit executes the sensing procedure, the controlling unit switches the first and second lower switches of the bridge switching unit to turn off and reads the sensing voltage signal of the positive electrode of the corresponding load connected to the bridge switching unit through the signal reading unit.

18. The multi-port driving and sensing circuit as claimed in claim 17, wherein when the controlling unit executes the driving procedure, the controlling unit switches the second upper switch of the bridge switching unit to turn on to supply the driving voltage to the positive electrode of the corresponding load.

19. The multi-port driving and sensing circuit as claimed in claim 17, wherein the controlling unit has a processor switching the first and second upper switches and the first and second lower switches of each bridge switching unit to turn on or off through a switch controller, wherein the processor is electrically connected to the signal reading unit and has a plurality of registers respectively connected to the first and second sensing terminals of the bridge switching units.

20. The multi-port driving and sensing circuit as claimed in claim 17, wherein the power unit is a voltage booster;

each of the first and second upper switches and each of the first and second lower switches are MOSFET; and the load is a piezoelectric sensor.

* * * * *